Patented Aug. 31, 1926.

1,598,464

UNITED STATES PATENT OFFICE.

PAUL WAGNER, OF CULBERTSON, MONTANA.

ANTIFREEZING SOLUTION.

No Drawing.   Application filed September 10, 1923. Serial No. 661,994.

The present invention relates to an antifreezing mixture, which is suitable for various purposes, for example, it can be used in automobile radiators.

The preferred composition is 6 ounces of common salt, 6 ounces of catechu (solid extract) in 1 gallon of soft water. The catechu can be first dissolved in a small amount of water heated to near the boiling point, and added to the rest of the water and salt added and stirred until dissolved.

This solution will withstand freezing down to about 10 degrees below zero Fahrenheit. If subjected to extremely low temperatures, such as 30 degrees below zero Fahrenheit, there will be small crystals of ice formed or a net work of such crystals, but the crystals are soft and mushy, so that they do not swell as hard ice, to cause breakage of radiators and the like.

I claim:—

1. An anti-freezing composition containing water, having common salt and catechu in solution.

2. An anti-freezing solution containing per gallon of water 6 ounces of catechu and 6 ounces of common salt.

In testimony whereof I affix my signature.

PAUL WAGNER.